United States Patent
Schnittger et al.

(10) Patent No.: US 10,427,663 B2
(45) Date of Patent: Oct. 1, 2019

(54) DUAL-PISTON RELAY VALVE HAVING AN ANTI-COMPOUNDING FUNCTION

(71) Applicant: KNORR-BREMSE Systeme fuer Nutzfahrzeuge GmbH, Munich (DE)

(72) Inventors: Karsten Schnittger, Munich (DE); Oliver Kaupert, Munich (DE); Stefan Langenbach, Munich (DE); Mustafa Uslu, Munich (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 180 days.

(21) Appl. No.: 15/381,869

(22) Filed: Dec. 16, 2016

(65) Prior Publication Data

US 2017/0096133 A1   Apr. 6, 2017

Related U.S. Application Data

(63) Continuation of application No. PCT/EP2015/062225, filed on Jun. 2, 2015.

(30) Foreign Application Priority Data

Jun. 18, 2014   (DE) .................. 10 2014 108 558

(51) Int. Cl.
  B60T 15/18   (2006.01)
  B60T 15/20   (2006.01)
  (Continued)

(52) U.S. Cl.
  CPC .............. B60T 15/206 (2013.01); B60T 7/20 (2013.01); B60T 13/683 (2013.01); B60T 15/02 (2013.01); B60T 15/182 (2013.01)

(58) Field of Classification Search
  CPC .......... B60T 7/20; B60T 13/683; B60T 15/02; B60T 15/182; B60T 15/206; B60T 15/18
  See application file for complete search history.

(56) References Cited

U.S. PATENT DOCUMENTS 3,525,555 A   8/1970 Meyer et al.
4,575,157 A   3/1986 Reinecke
(Continued)

FOREIGN PATENT DOCUMENTS

CH   492 587 A   6/1970
DE   1 980 549 U   3/1968
(Continued)

OTHER PUBLICATIONS

International Preliminary Report on Patentability (PCT/IB/338 & PCT/IB/373) issued in PCT Application No. PCT/EP2015/062225 dated Dec. 29, 2016, including English translation of document C2 (German-language Written Opinion (PCT/ISA/237)) previously filed on Dec. 16, 2016 (Seven (7) pages).

(Continued)

*Primary Examiner* — Thomas W Irvin
(74) *Attorney, Agent, or Firm* — Crowell & Moring LLP

(57) ABSTRACT

A relay valve is provided for a vehicle. The valve includes a parking brake piston that is displaceable in a housing and an axially displaceable cuff, a first compressed-air chamber for receiving compressed air from a control line is formed between the parking brake piston and the housing. The valve is also provided with a first spring element, which axially applies a pre-loading force to the cuff, and with a second spring element, which axially applies another pre-loading force to the parking brake piston. An axially displaceable service brake piston is arranged axially between the parking brake piston and the cuff, the service brake piston rests at least radially against the parking brake piston and radially against the housing in a sealing manner, in order to form a second compressed-air chamber.

10 Claims, 2 Drawing Sheets

(51) Int. Cl.
    *B60T 7/20*          (2006.01)
    *B60T 13/68*        (2006.01)
    *B60T 15/02*        (2006.01)

(56) References Cited

U.S. PATENT DOCUMENTS

| | | | |
|---|---|---|---|
| 5,042,883 A | | 8/1991 | McCann et al. |
| 5,277,484 A | | 1/1994 | Kiel |
| 6,116,280 A | | 9/2000 | Goodell |
| 6,247,764 B1 | * | 6/2001 | Koelzer .......... B60T 8/323 303/118.1 |
| 7,077,481 B2 | * | 7/2006 | Marsh ............ B60T 13/261 137/627.5 |
| 7,204,563 B2 | * | 4/2007 | Soupal ........... B60T 13/263 303/15 |
| 8,297,713 B2 | * | 10/2012 | Soupal ........... B60T 7/20 303/123 |
| 8,899,387 B2 | * | 12/2014 | Shaw ............. B60T 8/327 137/596.16 |
| 9,157,543 B2 | * | 10/2015 | Herges .......... B60T 7/20 |

FOREIGN PATENT DOCUMENTS

| | | |
|---|---|---|
| DE | 29 31 360 A1 | 2/1981 |
| DE | 36 05 444 A1 | 9/1986 |
| DE | 103 55 311 A1 | 4/2005 |
| DE | 10 2007 051 150 A1 | 11/2008 |
| EP | 0 131 683 A2 | 1/1985 |
| EP | 0 407 751 A1 | 1/1991 |
| EP | 0 540 852 A1 | 5/1993 |
| EP | 1518773 A1 * | 3/2005 ............. B60T 15/20 |
| EP | 2 407 355 A1 | 1/2012 |
| EP | 2 240 352 B1 | 10/2012 |
| EP | 2 407 355 B1 | 5/2013 |
| FR | 2 354 227 A1 | 1/1978 |
| GB | 1 233 326 A | 5/1971 |
| GB | 1 534 253 A | 11/1978 |

OTHER PUBLICATIONS

International Search Report (PCT/ISA/210) issued in PCT Application No. PCT/EP2015/062225 dated Nov. 18, 2015 with English translation (seven pages).

German-language Written Opinion (PCT/ISA/237) issued in PCT Application No. PCT/EP2015/062225 dated Nov. 18, 2015 (five pages).

German Office Action issued in counterpart German Application No. 10 2014 108 558.2 dated Mar. 10, 2015 (eight pages).

\* cited by examiner

DUAL-PISTON RELAY VALVE HAVING AN ANTI-COMPOUNDING FUNCTION

CROSS REFERENCE TO RELATED APPLICATIONS

This application is a continuation of PCT International Application No. PCT/EP2015/062225, filed Jun. 2, 2015, which claims priority under 35 U.S.C. § 119 from German Patent Application No. 10 2014 108 558.2, filed Jun. 18, 2014, the entire disclosures of which are herein expressly incorporated by reference.

BACKGROUND AND SUMMARY OF THE INVENTION

The invention relates to a relay valve for a vehicle, including a parking brake piston that is displaceable axially in a housing and an axially displaceable cuff. A first compressed air chamber for receiving compressed air from a control line is formed between the parking brake piston and the housing. A first spring element also being provided, which loads the cuff axially with a preloading force. And, a second spring element is provided, which loads the parking brake piston axially with a further preloading force. The invention also relates to a method for operating such a relay valve.

Such a relay valve is primarily used in parking brake devices for commercial vehicles, in order to implement a secure anti-compounding function.

Parking brakes—also called emergency brakes—of commercial vehicles, including trailers but also rail vehicles, are currently regularly equipped with spring accumulator brake cylinders which, in a released position, apply compressed air to a spring compression chamber and as a result keep the spring loaded, while for the parking brake function, the spring compression chamber is vented, i.e. connected to atmospheric pressure, so that the brake cylinder generates a braking force under the action of the spring (cf. Bosch, Motor Vehicle Technical Pocketbook, 22nd edition, Dusseldorf, 1995, p. 648).

In current braking systems for commercial vehicles, relay valves in combination with spring accumulator brake cylinders are installed for the parking brake function. When the vehicle is parked, the control line of the relay valve is vented, so that the spring accumulators are also vented. Strong springs in the spring accumulators press the brake pads against the brake disc. These spring forces have to be absorbed by the brake calipers, which leads to high stresses in the brake calipers.

If, in the parked state with no anti-compounding function, the service brake were also to be actuated, the brake pads would additionally also be pressed pneumatically against the brake disc. These forces would likewise have to be absorbed by the brake calipers, so that, as a result of this superimposition, overloading of the brake calipers would occur.

This overloading of the brake calipers is prevented by the anti-compounding function. Overloading when the parking brake is engaged and with simultaneous actuation of the service brake is no longer possible, since the forces on the brake caliper from the parking brake are reduced to the same extent as the forces on the brake caliper from the service brake rise. As a rule, a changeover valve (select-high valve) is incorporated in the control line of the relay valve for this purpose. When the control line of the relay valve is vented (parked state), the brake pressures can reach the control line of the relay valve via the select-high valve. The resultant pressure rise in the spring accumulators reduces the braking forces of the parking brake.

EP 2 240 352 B1 discloses a parking brake device for motor vehicles having a spring accumulator brake cylinder that can be activated by a relay valve. The relay valve can be activated via a safety valve formed as a 3/2-way valve, the output of which can optionally be connected to one of two inputs. The inputs of the safety valve are connectable optionally to a pressure medium source or atmospheric pressure via a first or second solenoid valve. A select-low valve is connected to the one input and the output of the safety valve, and an output of the select-low valve is connected to a control input of the relay valve. An anti-compounding function is achieved in that, between the select-low valve and the pneumatic control input of the relay valve, a select-high valve is also connected, one input of which is fed with the output from the select-low valve and the other input of which is fed with the pressure of the service brake. The select-high valve selects the higher of the two pressures and feeds the same to the control input of the relay valve. It is therefore ensured that the control input of the relay valve is only ever loaded with an unambiguously defined pressure and that the service brake has priority over the parking brake.

Furthermore, EP 2 407 355 B1 discloses a relay valve having a control piston and a cuff, both being displaceable in an axial direction. A first resilient element is provided, which loads the cuff in the axial direction with a preloading force, and also a second resilient element, which loads the control piston in the axial direction with a further preloading force. A control line of the electrically operable emergency braking system in which the relay valve is arranged is connected via a relay control line and a changeover valve to the relay control input of the relay valve. Also connected to the changeover valve is a service brake line. The service brake pressure is led to the relay valve via the changeover valve. The latter discharges pressure into the spring accumulators in accordance with the activation, which pressure works against the spring force and service brake pressure and, for the most part, compensates for the latter. Overloading of the components can thus be avoided. The first resilient element is used to offset the characteristic curve. The offset of the characteristic curve is required by a control valve device, what is known as a PCV valve. Starting from, a certain control pressure, the latter switches from the driving position into the parking position. An auxiliary braking action is achieved in that, in the driving position, the control pressure is reduced. In order for the control valve device to remain in the driving position and for the lowest possible pressure to be reached on the output from the relay valve, there exists an offset of the relay valve characteristic curve. This offset has the disadvantage that, with an anti-compounding function via a select-high valve, the action of relieving the brake calipers by filling the spring accumulators takes place too slowly. As a result, despite the anti-compounding function, overloading on the brake caliper arises in certain situations.

The object of the present invention is to further develop a relay valve in order to implement an improved anti-compounding function.

This and other objects are achieved according to the invention by an axially displaceable service brake piston arranged axially between the parking brake piston and the cuff, said service brake piston coming into contact at least radially against the parking brake piston and radially against the housing in a sealing manner, in order to form a second compressed air chamber. As a result, the disadvantage of overloading the relay valve having a piston is avoided. The air pressure from a control line connected to a control connection acts on the service brake piston without offset, on account of the resilient element. As a result, an anti-compounding characteristic curve is not displaced, so that the anti-compounding function is achieved more rapidly. Furthermore, a valve unit is dispensed with, in particular the select-high valve. As a result, both the overall space requirement and the outlay on assembly are reduced.

As a result of the load-relieving surface that is produced between the parking brake piston and the service brake piston, the anti-compounding characteristic curve becomes flatter. This has the advantage that the compensation of the forces on the brake caliper runs more linearly, so that a "roll-back effect" is avoided. The roll-back effect appears when, for example, a truck is standing on a hill and the anti-compounding function acts during parking. If a certain force is undershot during the compensation operation of the forces on the brake caliper, the truck rolls.

The housing can, in particular, include a plurality of partial housings, but preferably two, which are connected to one another. The service brake piston together with the parking brake piston forms a dual piston. Advantageously, the parking brake piston and the service brake piston have a circumferential groove on the outer circumferential surface thereof, in each of which there is arranged a sealing element, in particular an O-ring, which seals off the pressure chambers pneumatically. Furthermore, a further sealing element, in particular an O-ring, is arranged radially between the parking brake piston and the service brake piston.

It is proposed that it be possible for the second compressed air chamber to be fed directly with compressed air from a service brake line, which is arranged on a service brake. In other words, no further valves or elements similarly affecting the pressure, such as a select-high valve or a changeover valve, for example, are located in the service brake line between the relay valve and the service brake. Consequently, the anti-compounding function is implemented directly in the relay valve by the functionality of the dual piston.

Preferably, a third compressed air chamber for setting the air pressure in an output line connected via a venting connection is formed between the service brake piston, the housing and the cuff. The air pressure in the third compressed air chamber thus acts on an end face of the service brake piston, counter to the air pressure in the second compressed air chamber. Furthermore, however, the parking brake piston also acts axially on the service piston.

Furthermore, it is preferred for it to be possible for a pneumatic inlet of compressed air from a supply line, connected via a supply connection, for venting the third compressed air chamber to be formed axially between a valve seat on the housing side and the cuff. In other words, the valve seat with which the cuff comes into contact on account of the preloading force of the spring element is formed on the housing. If the cuff is displaced axially counter to the preloading force of the spring element, the inlet opens, so that compressed air from the supply line for venting the third chamber flows in.

The invention includes the technical teaching that a pneumatic outlet for venting the third chamber can be formed axially between a valve seat formed on the service brake piston and the cuff. If the third chamber is vented, the spring accumulator brake cylinders are also vented, so that the brake acts. The pneumatic outlet is closed by the service brake piston resting axially on the cuff.

Furthermore, a method for operating a relay valve is provided, which comprises at least five operating modes, specifically the operation of the relay valve:
when the vehicle is parked,
in the event of the service brake being actuated during the parked state,
when the vehicle is being driven,
when reducing the air pressure present on the output line, and
when increasing the air pressure present on the output line.

When the vehicle is parked, the control line, the service brake line and the output line are depressurized, the cuff coming axially into contact with the housing-side valve seat and the service brake piston being spaced axially apart from the cuff, so that the third compressed air chamber is vented via the opened outlet.

In the event that the service brake is actuated while the vehicle is parked, the service brake piston comes axially into contact with the cuff, the cuff being displaced axially counter to the preloading force of the first spring element, so that the inlet is opened and the outlet is closed.

When the vehicle is being driven, the control line, the supply line and the output line are loaded with compressed air, the service brake piston coming axially into contact with the cuff, so that the inlet and the outlet are closed.

When reducing the air pressure present on the output line, the air pressure in the first compressed air chamber is reduced in a controlled manner, the service brake piston lifting axially off the cuff, so that the outlet is opened and the third compressed air chamber is vented in a controlled manner.

When raising the air pressure present on the output line, the air pressure in the first compressed air chamber is increased in a controlled manner, the service brake piston displacing the cuff axially counter to the preloading force of the first spring element, so that the inlet is opened and the third compressed air chamber is vented in a controlled manner.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
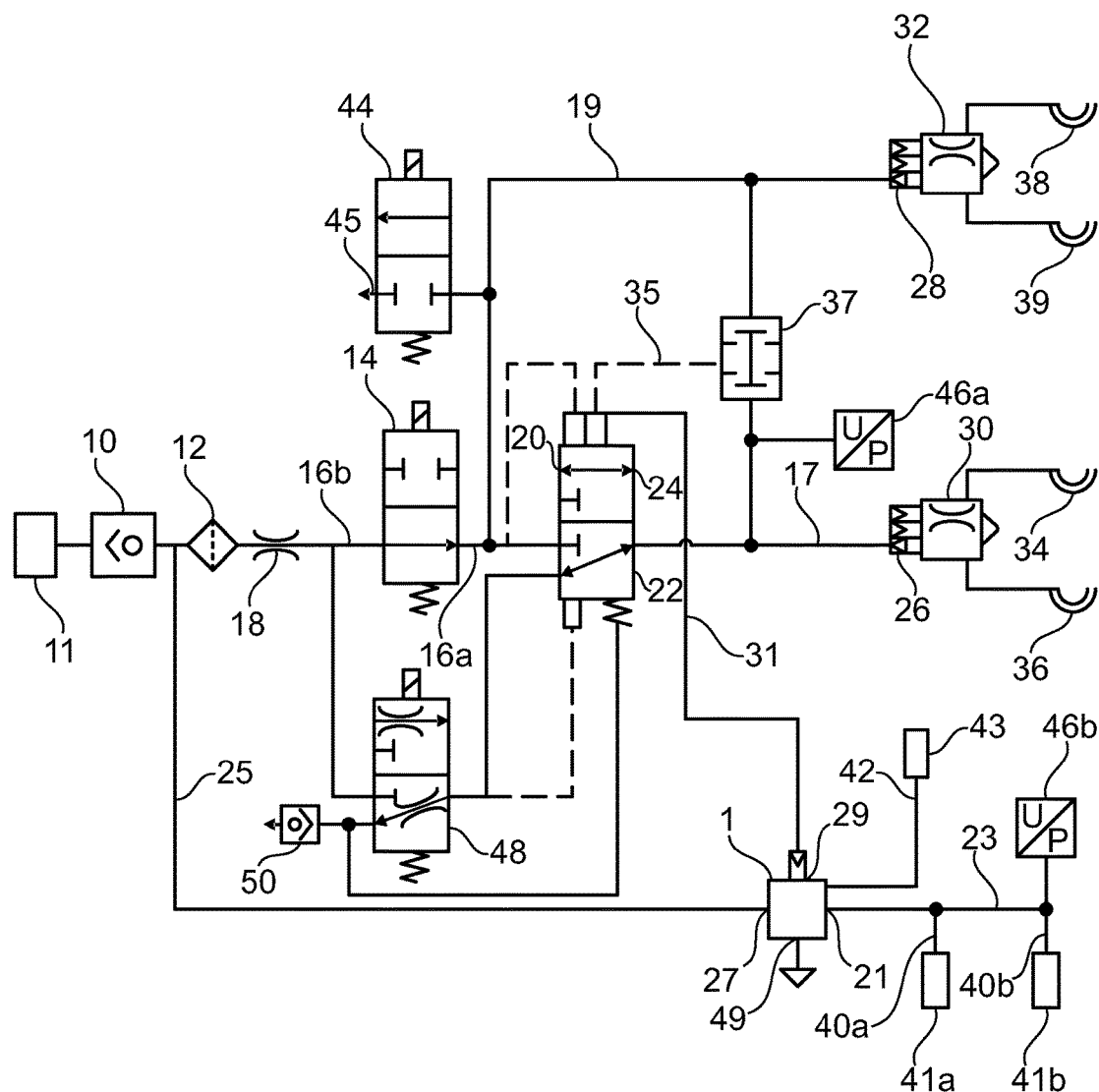
FIG. 1 is a schematic circuit diagram of an electrically operable emergency braking system according to an embodiment of the invention.

According to FIG. 1, the electrically operable emergency braking system is connected via a non-return valve 10 to a compressed air preparation system 11. The non-return valve 10 is followed by a filter unit 12, via which compressed air is supplied via a restrictor 18 to a supply solenoid valve 14, which is designed as a 2/2-way valve. A first working connection 20 of a control valve device 22 is connected to the output of the supply solenoid valve 14 via a first supply line section 16a. The line section having the filter unit 12 is designated as a second supply line section 16b. The control valve device 22 is designed as a pneumatically activatable 3/2-way valve. A second working connection 24 of the control valve device 22 leads via a trailer control line branch 17 to a control input 26 of a trailer control module 30. The latter controls a supply connection 34 and a control connection 36 of the trailer coupling. A control input 28 of a further trailer control module 32 is connected via a further trailer control line branch 19 to the supply line branch 16a. The trailer control module 32 has a supply connection 38 and a control connection 39. The trailer control line branches 17, 19 are connected to inputs of a select-low valve 37, the output from which is connected via a control line 35 to a control input 33 of the control valve device 22. The select-low valve 37 operates in such a way that the lower input pressure, that is to say the lower pressure from the two trailer control line branches 17, 19, is present on its output, that is to say in the control line 35. The control line 35 is further connected via a control line 31 to the control input 29 of the relay valve 1.

The relay valve 1 draws compressed air from a point upstream of the supply solenoid valve 14 via a supply line 25 at a supply connection 27. An output line 23 at a venting connection 21 leads to line branches 40a, 40b, to which spring accumulator brake cylinders 41a, 41b are connected. Also connected to the relay valve 1 is a service brake line 42, which is pneumatically connected to a service brake 43. When the service brake 43 is actuated, the emergency brake is automatically disengaged, in order to prevent overloading of the spring accumulator brake cylinders 41a, 41b.

Furthermore, a venting solenoid valve 44, designed as a 2/2-way valve, is provided, and is connected via the further trailer control line branch 19 to the supply line section 16a. The venting solenoid valve 44 has a venting solenoid valve connection 45, which opens into a vent. Also provided are pressure sensors 46a, 46b for measuring the pressures on the second working connection 24 of the control valve device 22 and the output line 23. Control chambers of the control valve device 22 are connected via a pressure compensating line 47 to a vent.

In the illustrated switching state of the electrically operable emergency braking system, the supply solenoid valve 14, the control valve device 22, the venting solenoid valve 44 and the control and venting valve device 48 are each in a first switching position. The second working connection 24 of the control valve device 22 is vented via a control and venting valve device 48, so that, in the absence of any pressure loading via the service brake line 42, the control input 29 of the relay valve 1 is also vented. The control and venting device 48 is connected to the vent via a non-return valve 50. Consequently, the spring accumulator brake cylinders 41a, 41b are depressurized, so that the emergency brake and thus also the vehicle are in a parked state. The control line 31 is therefore depressurized and the spring accumulator brake cylinders 41a, 41b are closed.

Figure 2:
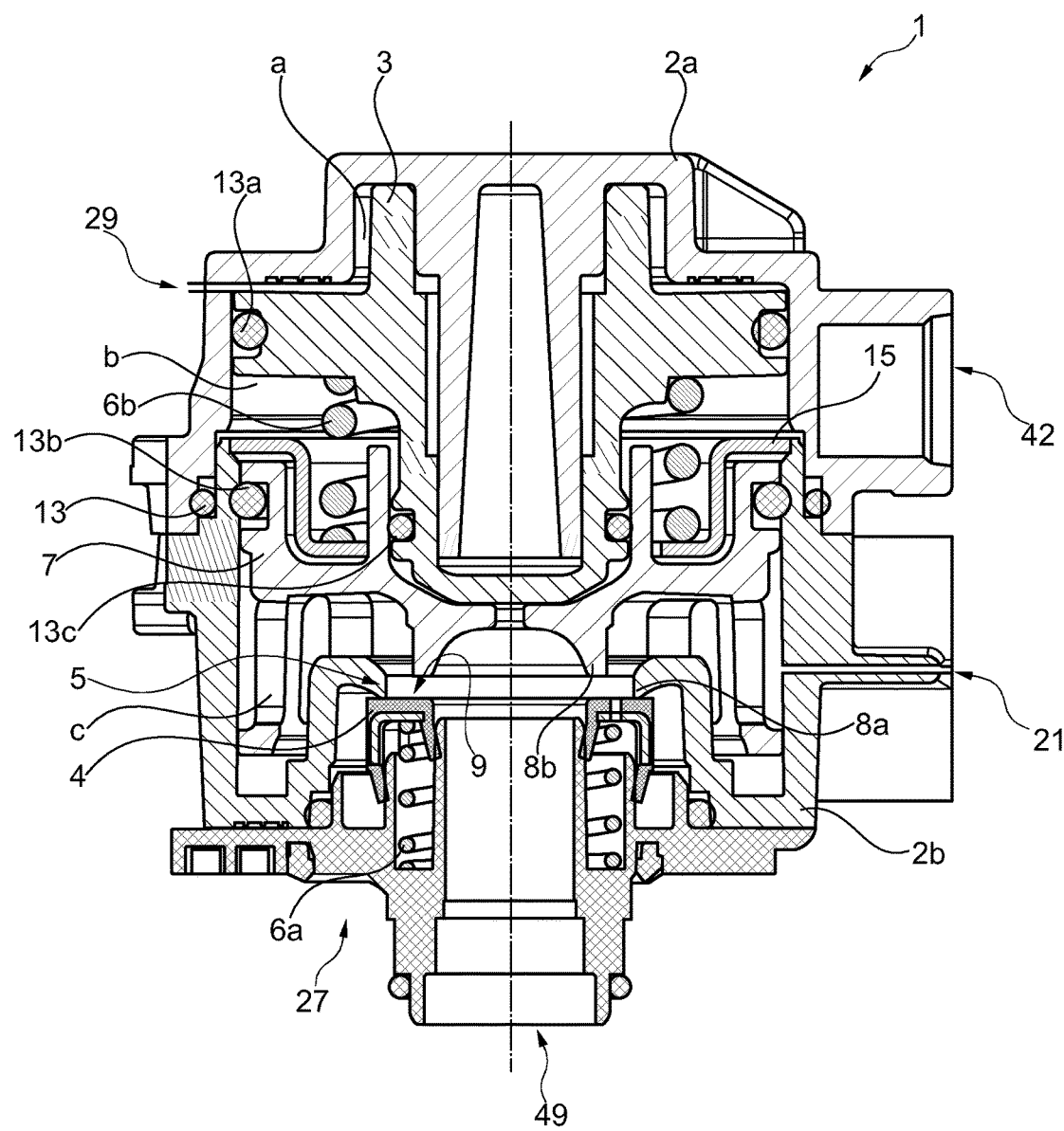
FIG. 2 is a schematic sectional illustration of the relay valve from FIG. 1.

According to FIG. 2, the relay valve 1 has a parking brake piston 3 that can be displaced axially in a first housing part 2a of a housing 2, and an axially displaceable cuff 4, which is arranged in a second housing part 2b of the housing 2. Consequently, the housing 2 is composed of the first housing part 2a and the second housing part 2b. To seal the two housing parts 2a, 2b pneumatically, an O-ring 13 is arranged radially in between. Formed between the parking brake piston 3 and the housing part 2a is a first compressed air chamber a for receiving compressed air from the control line 31.

Also provided is a first spring element 6a, which loads the cuff 4 axially with a preloading force, and a second spring element 6b, which loads the parking brake piston 3 axially with a further preloading force. The two spring elements 6a, 6b are formed as compression springs. Here, the second spring element 6b comes into contact with a spring plate 15 arranged on the second housing part 2b. The spring plate 15 has a central cut-out, through which the parking brake piston 3 and a service brake piston 7 coming radially and axially into contact therewith extend.

The service brake piston 7 is axially displaceable and is arranged axially between the parking brake piston 3 and the cuff 4. The service brake piston 7 can act on the cuff 4 exclusively via the service brake piston 7. The service brake piston 7 comes radially into contact with the second housing part 2b in a sealing manner, in order to form a second compressed air chamber b. The second compressed air chamber b can be fed directly with compressed air from the service brake line 42, which is arranged on the service brake 43. In order to seal the first and second compressed air chambers a, b pneumatically, an O-ring 13a, 13b, 13c is respectively arranged radially between the parking brake piston 3 and the first housing part 2a, and radially between the service brake piston 7 and the second housing part 2b, and also radially between the parking brake piston 3 and the service brake piston 7.

A third compressed air chamber c for setting the air pressure in the output line 23 is formed between the service brake piston 7, the second housing part 2b and the cuff 4. Axially between a housing-side valve seat 8a and the cuff 4, it is possible to form a pneumatic inlet 5 of compressed air from the supply line 27 for venting the third compressed air chamber c. For this purpose, the service brake piston 7 presses the cuff 4 axially counter to the preloading force of the compression spring 6b, as a result of which the inlet 5 between the housing-side valve seat 8a and the cuff 4 is produced. Furthermore, a pneumatic outlet 9 for venting the third chamber c can be formed axially between a valve seat 8b formed on the service brake piston 7 and the cuff 4. The pneumatic outlet 9 is closed by the fact that the service brake piston 7 comes axially into contact with the cuff 4. Either the pneumatic inlet 5 or the pneumatic outlet 9 can be opened, but not both at the same time.

LIST OF DESIGNATIONS

1 Relay valve
2a, 2b Housing
3 Parking brake piston
4 Cuff
5 Inlet
6a, 6b Spring element
7 Service brake piston
8a, 8b Valve seat
9 Outlet
10 Non-return valve
11 Compressed air preparation system
12 Filter unit
13, 13a-13c O-ring
14 Supply solenoid valve
15 Spring plate
16a, 16b Supply line section
17 Trailer control line branch
18 Restrictor
19 Trailer control line branch
20 First working connection
21 Venting connection
22 Control valve device
23 Output line
24 Second working connection
25 Supply line 26 Control input
27 Supply connection
28 Control input
29 Control input
30 Trailer control module
31 Control line
32 Trailer control module
33 Control inlet
34 Supply connection
35 Control line
36 Control connection
37 Select-low valve
38 Supply connection
39 Control connection
40a, 40b Line branch
41a, 41b Spring accumulator brake cylinder
42 Service brake line
43 Service brake
44 Venting solenoid valve
45 Venting solenoid valve connection
46a, 46b Pressure sensor
48 Control and venting valve device
49 Vent
50 Non-return valve
a First compressed air chamber
b Second compressed air chamber
c Third compressed air chamber The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A relay valve for a vehicle, comprising:
   a housing including a first housing part and a second housing part provided separately from the first housing part;
   a parking brake piston that is displaceable axially in the first housing part;
   an axially displaceable cuff;
   a first compressed air chamber for receiving compressed air from a control line formed between the parking brake piston and the first housing part;
   a first spring element, which loads the cuff axially with a preloading force;
   a second spring element, which loads the parking brake piston axially with a further preloading force, wherein the second spring element comes into contact with a spring plate arranged in the second housing part; and
   an axially displaceable service brake piston in the second housing part of the housing arranged axially between the parking brake piston and the cuff, said service brake piston coming into contact at least radially against the parking brake piston and radially against the housing in a sealing manner, in order to form a second compressed air chamber.

2. The relay valve according to claim 1, wherein
   the second compressed air chamber is fed directly with compressed air from a service brake line, which is arranged on a service brake.

3. The relay valve according to claim 1, wherein
   a third compressed air chamber for setting the air pressure in an output line connected via a venting connection is formed between the service brake piston, the housing and the cuff.

4. The relay valve according to claim 3, wherein
   a pneumatic inlet of compressed air from a supply line, connected via a supply connection, for venting the third compressed air chamber is formed axially between a valve seat on a side of the housing and the cuff.

5. The relay valve according to claim 3, wherein
   a pneumatic outlet for venting the third compressed air chamber can be formed axially between a valve seat formed on the service brake piston and the cuff.

6. A method of operating a relay valve for a vehicle, the relay valve comprising:
   a housing including a first housing part and a second housing part provided separately from the first housing part;
   a parking brake piston that is displaceable axially in the first housing part;
   an axially displaceable cuff;
   a first compressed air chamber for receiving compressed air from a control line formed between the parking brake piston and the first housing part;
   a first spring element, which loads the cuff axially with a preloading force;
   a second spring element, which loads the parking brake piston axially with a further preloading force, wherein the second spring element comes into contact with a spring plate arranged in the second housing part; and
   an axially displaceable service brake piston in the second housing part of the housing arranged axially between the parking brake piston and the cuff, said service brake piston coming into contact at least radially against the parking brake piston and radially against the housing in a sealing manner, in order to form a second compressed air chamber, wherein
   the second compressed air chamber is fed directly with compressed air from a service brake line, which is arranged on a service brake, and
   a third compressed air chamber sets the air pressure in an output line connected via a venting connection is formed between the service brake piston, the housing and the cuff,
   the method comprising the acts of:
   when the vehicle is parked, depressurizing the control line, the service brake line and the output line, wherein
   the cuff comes axially into contact with a housing-side valve seat and the service brake piston is spaced axially apart from the cuff, whereby the third compressed air chamber is vented via a pneumatic outlet formed axially between a valve seat formed on the service brake piston and the cuff.

7. The method according to claim 6, further comprising the act of:
   upon actuating the service brake while the vehicle is parked, bringing the service brake piston axially into contact with the cuff, wherein the cuff is displaced axially counter to the preloading force of the first spring element so that a pneumatic inlet formed axially between a housing-side valve seat and the cuff is opened and the pneumatic outlet is closed.

8. The method according to claim 6, further comprising the act of:
   when the vehicle is driven, loading the control line, the supply line, and the output line with compressed air, wherein
   the service brake piston comes axially into contact with the cuff so that the pneumatic inlet and the pneumatic outlet are closed.

9. The method according to claim 6, further comprising the act of:
   when reducing air pressure present on the output line, reducing the air pressure in the first compressed air chamber in a controlled manner, wherein
   the service brake piston lifts axially off the cuff so that the pneumatic outlet is opened and the third compressed air chamber is controllably vented.

10. The method according to claim 6, further comprising the act of:
    when increasing the air pressure present on the output line, increasing the air pressure in the first compressed air chamber in a controlled manner, wherein
    the service brake piston displaces the cuff axially counter to the preloading force of the first spring element so that the pneumatic inlet is opened and the third compressed air chamber is controllably vented.

* * * * *